(12) United States Patent
Hilton et al.

(10) Patent No.: US 12,723,420 B2
(45) **Date of Patent: *Sep. 1, 2026**

(54) MICRO INJECTION FLOORING REPAIR ASSEMBLY AND METHOD

(71) Applicant: Red Devil, Incorporated, Tulsa, OK (US)

(72) Inventors: Tracy Hilton, Jensen Beach, FL (US); Kenneth Hilton, Jensen Beach, FL (US)

(73) Assignee: Red Devil, Incorporated, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/282,821

(22) Filed: Jul. 28, 2025

(65) Prior Publication Data

US 2025/0361734 A1 Nov. 27, 2025

Related U.S. Application Data

(63) Continuation of application No. 18/134,172, filed on Apr. 13, 2023, now Pat. No. 12,410,628.

(Continued)

(51) Int. Cl.
*E04G 23/02* (2006.01)
*B05C 17/005* (2006.01)
*B29C 65/54* (2006.01)

(52) U.S. Cl.
CPC .... *E04G 23/0285* (2013.01); *B05C 17/00516* (2013.01); *B29C 65/542* (2013.01)

(58) Field of Classification Search
CPC .......... E04G 23/0285; B05C 17/00506; B05C 17/00513; B05C 17/00596; B29C 65/542

(Continued)

(56) References Cited

U.S. PATENT DOCUMENTS 5,441,180 A 8/1995 Woodruff
9,151,066 B1 10/2015 Hilton et al.

(Continued)

FOREIGN PATENT DOCUMENTS

CN 107724704 A 2/2018
WO 2010041075 A2 4/2010
WO 2022063703 A1 3/2022

OTHER PUBLICATIONS

Hypodermic Needle Gauge Chart, Medical Tube Technology, Inc. © 2004, "http://www.medtube.com/hypo_chrt.htm", Accessed via the Wayback Machine at "https://web.archive.org/web/20041010031333/http://www.medtube.com/hypo_chrt.htm", (Year: 2004).

*Primary Examiner* — Carson Gross
(74) *Attorney, Agent, or Firm* — David Guerra

(57) ABSTRACT

A micro injection assembly for the repair of floors that includes an adapter body operably configured to couple with a tube having adhesive and defining an internal channel, a hub selectively removably coupled to the adapter body and having a rigid needle member coupled thereto and recessed within the hub, wherein the rigid needle member projects outwardly from the second end of the hub in a linear orientation, has a blunt distal end, and defines a needle channel spanning the length of the needle member. The assembly also includes a cap selectively removably couplable to the adapter body in a watertight configuration and with the cap disposable in an overlapping configuration with the adapter body. The assembly is operable to effectuate emission of an adhesive material from a tube through the adapter body, hub, and needle member to spaces between a flooring material and subfloor.

16 Claims, 5 Drawing Sheets

Related U.S. Application Data

(60) Provisional application No. 63/341,863, filed on May 13, 2022.

(58) Field of Classification Search
USPC ........................................................... 156/71
See application file for complete search history.

(56) References Cited

U.S. PATENT DOCUMENTS

| | | | | |
|---|---|---|---|---|
| 12,410,628 | B2 * | 9/2025 | Hilton | E04G 23/0203 |
| 2010/0155424 | A1 | 6/2010 | Tsai | |
| 2013/0214013 | A1 * | 8/2013 | Milan | B05C 17/00509 222/538 |
| 2015/0158050 | A1 | 6/2015 | Atwell | |
| 2016/0296962 | A1 | 10/2016 | Maxa et al. | |
| 2021/0154697 | A1 | 5/2021 | Bublewitz et al. | |

* cited by examiner

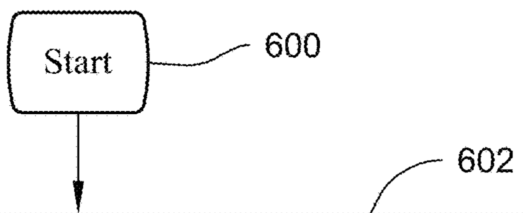

Provide an adapter body with a threaded configuration and an internal channel therethrough, a hub with a rigid needle member coupled thereto, of a slender configuration, having, defining a needle channel therethrough, and having a distal end defining an opening, and a cap

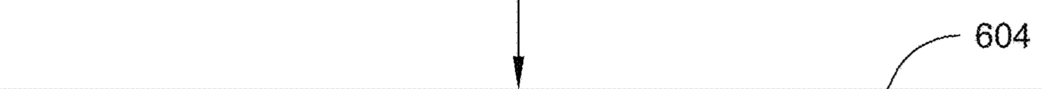

Couple the threaded configuration of the adapter body to a threaded configuration of a tube filled with an adhesive material and coupling the hub to the adapter body in a watertight configuration

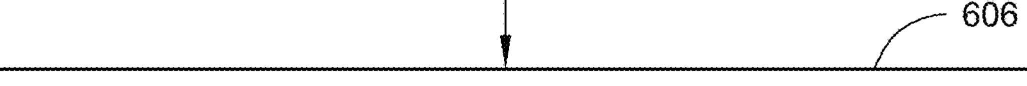

Insert the rigid needle member into an opening adjacent to or between two pieces of flooring material loosely coupled to a subfloor

608

Modulate the tube to transport the adhesive material from the tube through the internal channel, through the needle channel, out through the opening of the distal end of the rigid needle member, and between the flooring material and subfloor

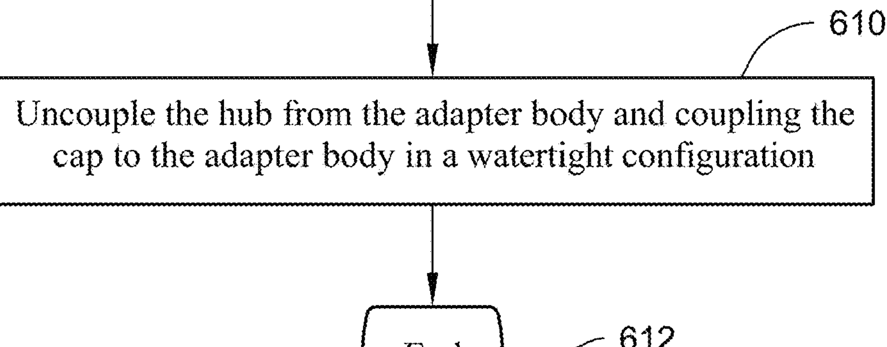

FIG. 6

MICRO INJECTION FLOORING REPAIR ASSEMBLY AND METHOD

CROSS-REFERENCE TO RELATED APPLICATION

This application is a continuation under 35 U.S.C. § 120 based upon co-pending U.S. patent application Ser. No. 18/134,172 filed on Apr. 13, 2023, where U.S. patent application Ser. No. 18/134,172 claims priority to U.S. provisional application Ser. No. 63/341,863 filed on May 13, 2022. The applications are incorporated herein by reference in their entirety.

FIELD OF THE INVENTION

The present invention relates generally to flooring repair, and more particularly, to an assembly and method of injecting adhesive into flooring including tile, marble, stone, wood, engineered, laminate, vinyl, etc. and/or very narrow joints or tight spaces or floors with very narrow or no grout lines.

BACKGROUND OF THE INVENTION

Traditional methods for repairing a floor where the flooring material has become separated from the subfloor, such as a concrete slab, usually involve removing the flooring material from the subfloor and cleaning both the subfloor and the flooring material, then reinstalling the flooring material. In some situations, the flooring material cannot be reinstalled, which then requires finding matching replacement flooring material or replacing all the flooring material, which can be difficult or impossible to do.

More recent methods for repairing a floor where the flooring material has become separated from the subfloor include delivering a liquid adhesive between the flooring material and the subfloor via a few drilled holes in the floor while leaving the flooring material in place. The liquid adhesive is then allowed to set, thereby adhering the flooring material to the subfloor. A method like this is disclosed in Applicant's prior patent, U.S. Pat. No. 9,151,066, entitled an "apparatus and method to fix a floor", which is incorporated in its entirety herein by reference. This prior art however has the disadvantage of a wider injection nozzle tip (approximately ⅛-inch diameter), preventing efficient and successful use of the assembly in cases of very narrow or no grout line applications, or in marble, tile, stone, wood, laminate, vinyl, etc.

Therefore, a need exists to overcome the problems with the prior art as discussed above.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 6 depicts an exemplary process flow diagram showing a method of repairing loose flooring in accordance with one embodiment of the present invention.

SUMMARY OF THE INVENTION

Figure 1:
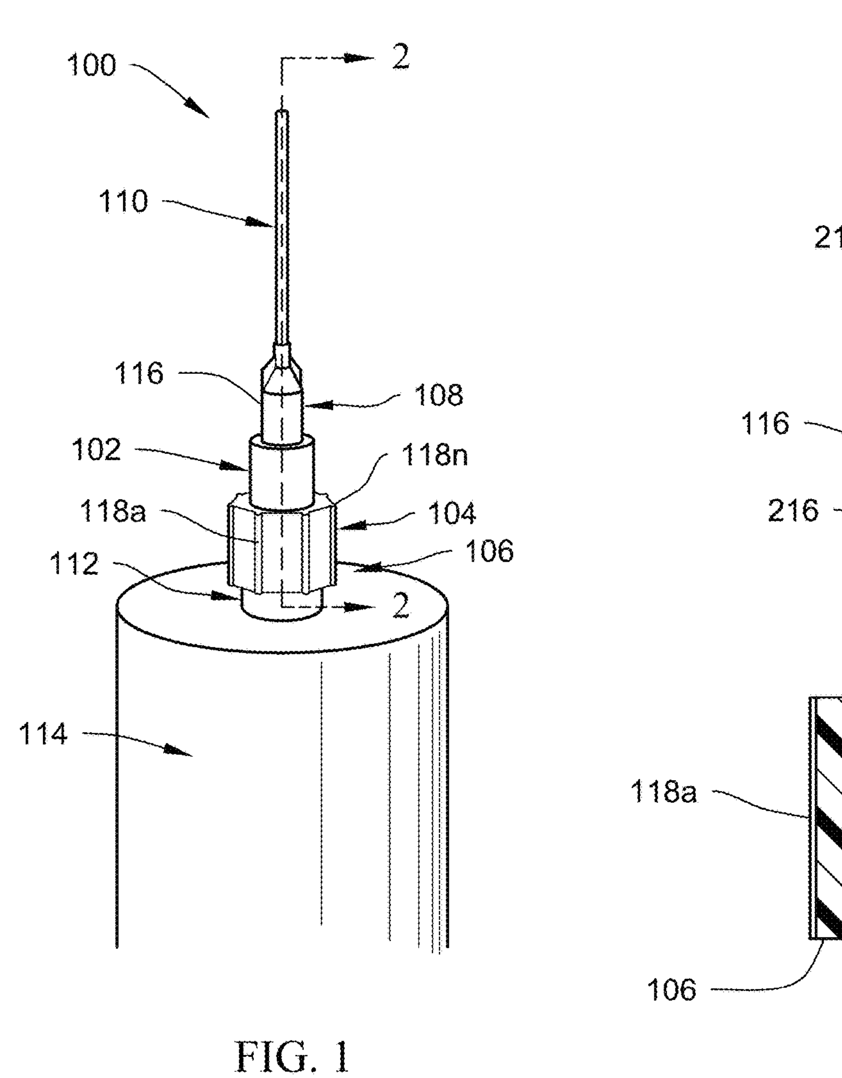
FIG. 1 is a front perspective view of an adaptor of a micro injection assembly with an injection needle therein, in accordance with an exemplary embodiment of the micro injection assembly.
Figure 2:
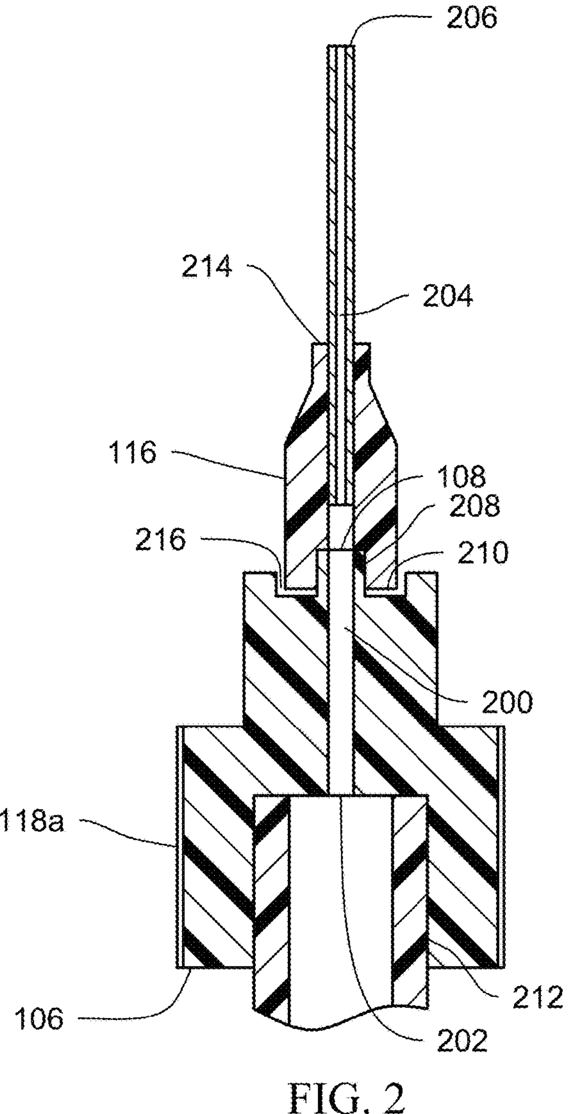
FIG. 2 is a sectional view of the micro injection assembly in FIG. 1 along section line 2-2, in accordance with the present invention.

The invention provides a micro injection flooring repair assembly and method that overcomes the hereinafore-mentioned disadvantages of the heretofore-known devices and methods of this general type and that provides a more efficient applicator of a liquid adhesive on broken, separated, squeaky, hollow or loose floors. The present invention is operably configured to fix loose wood flooring, marble floors, tile floors, stone floors, laminate, etc., as well as floors with no grout lines like marble or where existing tips are still too big for the application. This allows for many more additional and versatile ways to inject adhesives into the floor.

In one aspect, the present technology can include a micro injection system for repairing of floors. The system can include an adapter body, a hub, a needle member and a cap. The adapter body can have a first end, a second end opposing the first end of the adapter body, a recessed internal wall surface defining a configuration operably configured to couple with a tube, and defining an internal channel spanning from the first end of the adapter body to the second end of the adapter body. The hub can have a first end disposed in an adjacent configuration with the second end of the adapter body, having a second end opposing the first end of the hub. The needle member can project outwardly from the second end of the hub in a linear orientation. The needle member can have a distal end, and can define a needle channel spanning from the distal end to the first end of the hub, wherein the needle channel is in fluid communication with the internal channel. The cap can be selectively removably couplable to the adapter body in a watertight configuration with the cap disposable in an overlapping configuration with the second end of the adapter body.

In another aspect, the present technology can include a method of repairing loose flooring including the steps of providing an adapter body defining an internal channel therethrough, a hub with a needle member, the needle member defining a needle channel therethrough, and having a distal end defining an opening. Coupling the adapter body to a tube filled with an adhesive material and having the hub in a watertight configuration with the adapter body. Inserting the needle member into an opening adjacent to a piece of flooring material loosely coupled to a subfloor. Modulating the tube to transport the adhesive material from the tube through the internal channel, through the needle channel, out through the opening of the distal end of the needle member, and between the flooring material and subfloor. Coupling a cap to the adapter body in a watertight configuration.

With the foregoing and other objects in view, there is provided, in accordance with the invention, a micro injection assembly for the repair of floors that includes an adapter body having a first end, a second end opposing the first end of the adapter body, a recessed internal wall surface defining a threaded configuration operably configured to couple with a threaded tube, and defining an internal channel spanning from the first end of the adapter body to the second end of the adapter body, a hub selectively removably coupled to the adapter body, having a first end disposed in a directly adjacent configuration with the second end of the adapter body, having a second end opposing the first end of the hub, and having a rigid needle member coupled thereto and recessed within the hub, wherein the rigid needle member projects outwardly from the second end of the hub in a linear orientation, has a blunt distal end, and defines a needle channel spanning from the blunt distal end to the first end of the hub, wherein the needle channel is in fluid communication with the internal channel. The assembly also includes a cap selectively removably couplable to the adapter body in a watertight configuration with the cap disposable in an overlapping configuration with the second end of the adapter body, i.e., shaped and sized to couple with the adapter body.

In accordance with another feature, an embodiment of the present invention includes the adapter body having a lower section having the first end of the adapter body and the recessed internal wall surface and an upper section adjacent to the lower section, having the second end of the adapter body, and tapered in diameter relative to a diameter of the lower section of the adapter body.

In accordance with yet another feature, an embodiment of the present invention also includes the upper section having a spout surrounded by a recessed annular channel, the recessed annular channel with the hub disposed therein.

In accordance with a further feature of the present invention, the lower section and the upper section are of a monolithic structure.

In accordance with an additional feature of the present invention, the rigid needle member is of a slender configuration.

In accordance with a further feature of the present invention, the rigid needle member ranges in dimension from 12-30 gauge.

In accordance with yet another feature, an embodiment of the present invention also includes the adapter body having a spout surrounded by a recessed annular channel, the recessed annular channel with the hub disposed therein.

In accordance with a further feature, an embodiment of the present invention also includes an overall hub-needle length separating the first end of the hub and the distal end of the needle member and a needle member length separating the second end of the hub and the distal end of the needle member, wherein the overall hub-needle length has a length variance ranging from 0.5-2.2 in. relative to the needle member length.

In accordance with an additional feature of the present invention, wherein the overall hub-needle length has a length variance ranging from 0.5-1.5 in. relative to the needle member length.

The present invention is also embodied in a method of repairing loose flooring that includes the steps of providing an adapter body with a threaded configuration and an internal channel therethrough, a hub with a rigid needle member coupled thereto, of a slender configuration, having, defining a needle channel therethrough, and having a distal end defining an opening, and a cap, coupling the threaded configuration of the adapter body to a threaded configuration of a tube filled with an adhesive material and coupling the hub to the adapter body in a watertight configuration, inserting the rigid needle member into an opening adjacent to a piece of flooring material loosely coupled to a subfloor, modulating the tube to transport the adhesive material from the tube through the internal channel, through the needle channel, out through the opening of the distal end of the rigid needle member, and between the flooring material and subfloor, and uncoupling the hub from the adapter body adapter body and coupling the cap to the adapter body in a watertight configuration.

In accordance with a further feature, an embodiment of the present invention also includes coupling the cap to the adapter body in a hermetically sealed configuration and disposable in an overlapping configuration with a second end of the adapter body that is adjacent to a first end of the hub.

In accordance with an exemplary feature, an embodiment of the present invention also includes coupling the hub to the adapter body in directly adjacent configuration.

In accordance with an additional feature, an embodiment of the present invention also includes providing the adapter body with a spout surrounded by a recessed annular channel and coupling the hub to the adapter body until inserted within the recessed annular channel.

In accordance with yet another feature, an embodiment of the present invention also includes threadedly coupling the hub to the adapter body and providing the rigid needle member projecting from the hub in a linear orientation and having a blunt distal end.

In accordance with an exemplary feature, an embodiment of the present invention also includes providing the adapter body with a lower section having a first end of the adapter body and a recessed internal wall surface and an upper section adjacent to the lower section, having a second end of the adapter body located thereon, and tapered in diameter relative to a diameter of the lower section of the adapter body and coupling the recessed internal wall surface, with the threaded configuration thereon, to the adapter body to the tube.

In accordance with a further feature, an embodiment of the present invention also includes providing the rigid needle member that ranges in dimension from 12-30 gauge.

Although the invention is illustrated and described herein as embodied in a micro injection flooring repair assembly and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. Unless otherwise indicated by Applicant, the figures of the drawings are not necessarily drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the needle member and/or adhesive tube to which the needle member is attached, where applicable.

DETAILED DESCRIPTION OF THE INVENTION

While the specification concludes with claims defining the features of the invention that are regarded as novel, it is believed that the invention will be better understood from a consideration of the following description in conjunction with the drawing figures, in which like reference numerals are carried forward.

With reference to FIG. 1, the present invention provides a micro injection flooring repair assembly and method 100 (referred to as "assembly 100" hereinafter for brevity) for repairing loose or broken flooring in particularly narrow or tight spaces. Embodiments of the invention provide an assembly 100 and method that may be applied in connection with various types of flooring (e.g., wood, laminate, marble, etc.).

The assembly 100 is operably configured to be used for the repair of floors where a flooring material 300 (e.g., wood, tile, marble, etc.) has become separated from a subfloor 302 (e.g., wood or concrete, etc.) and a void is created between the flooring material 300 and the subfloor 302. The assembly 100 comprises an adaptor 102 comprising a body 104 having a first end 106, a second end 108 opposite the first end 106 and selectively resealable with a resealable cap 400. The body 104 can be seen defining an internal channel 200 spanning between the first end 106 and the second end 108 of the body 104, wherein the internal channel 200 is shaped, sized, and configured (with the first end 106) to receive and transport a liquid adhesive from an upper aperture 202 defined by a mouth 112 of an adhesive tube 114.

The body 104 can be seen having adjacent tapering wall sections, wherein the upper section of can be seen defining the second end 108 and the lower section can be seen defining the first end 106. The upper section has an outer diameter less than the outer diameter of the lower section to facilitate in enabling the adapter 102 to reach smaller areas. The adapter is preferably cylindrical and has a diameter of approximately 0.5-2 in. The upper section of the body 104 can be seen defining a recessed annular channel shaped to receive a hub 116 having a substantially rigid (for brevity, referred to as "rigid") needle member 110 coupled thereto. More specifically, the body 104 can be seen defining a spout 208 at or defining (at least in part) the second end 108 and that is surrounded by the annular channel. The spout 208 may define an enclosure spout aperture in fluid communication with the internal channel 200, wherein the hub 116 is configured to selectively couple with and surround the spout of the when the user desires to inject and emit adhesive.

The hub 116 and/or needle member 110 can be seen defining an elongated needle channel 204 that spans from the opening of the spout 208 to the distal end, or free end, 206. In one embodiment, the needle channel 204 is linear (like the structure of the needle member 110) and, when not connected to the spout 208, spans from a first end 210 of the hub 116 to the distal end 206 of the needle member 110. In one embodiment, the needle member 110 may be permanently coupled or fastened to the hub 116 with, for example, adhesive, to reduce possibility of failure when inserting, for example, the needle member 110 into an opening 304 defined by two opposing pieces of flooring 302. In other embodiments, the needle member 110 may be selectively removable form the hub 116 with one or more fasteners or a tongue-and-groove coupling configuration.

In one embodiment, the second end 108 of the adapter body 104 is configured to receive the hub 116 of the injection needle 110 by selectively screwing the hub 116 to the adapter body 104. Said another way, the hub 116 and/or needle member 110 may be selectively removably couplable to the adapter body 104 with a tongue-and-grove configuration, which includes a threaded configuration. In preferred embodiments, this coupling configuration is a watertight configuration substantially preventing any material from the tube 114 from escaping from the first end 106 of the adapter body 104. As such, the adapter 102 and needle member 110 are operably configured to deliver the adhesive or other material through the internal channel and needle channel, respectively, out through an opening defined by the distal end 206 of the needle member 110.

In one embodiment, the body 104 is made from of a substantially rigid polymeric material, e.g., medium-density nylon, and may be of a monolithic structure forming the internal channel. The adapter 102 may beneficially include one or more longitudinally oriented spaced-apart flanges 118*a-n* configured to facilitate the user in selectively coupling and uncoupling the adapter from the mouth 112 of the tube 114, wherein "n" represents any number greater than one. The adapter 102 may also include a recessed internal wall surface 212 defining a threaded configuration configured to thread or couple with the threads on the mouth 112 of the tube 114, typically in a watertight configuration. In preferred embodiments, only the lower section of the adapter 102 has the recessed internal wall surface 212.

Said another way, the adaptor 102 is configured to attach to a pre-filled standard 10 oz. size tube cartridge 114 that features an external threaded nipple/mouth 112 that is conventionally formed to accept a nozzle to emit contents of the tube cartridge 114. The user may need to drill a hole or otherwise create an opening in the mouth 112 of the tube 114 to provide access to the contents of the tube cartridge 114. The adaptor fitting 102 attaches to the nipple/mouth 112 and permits either the needle member 110 or cap 400 to selectively couple thereto, thereby preserving the contents of the tube 114 when not desired for use. When desired for use, the needle member 110, preferably along with a caulk gun, enables the contents of the tube, e.g., adhesive, to travel through the adapter 102, needle member 110, out through the distal end 206, and dispense into the void between the flooring material 300 and the subfloor 302 (until typically reaching another gap or opening created between the flooring material 300—wherein any excess adhesive material is wiped clean). The resealable cap 400 is operably configured to seal, preferably hermetically, the second end 108 or internal channel 200 when the adapter 102 is not desired for use, thereby beneficially preventing the liquid adhesive from drying out. The second end 108 is also operably configured and proportionately sized and shaped to receive the injection needle 110. In an exemplary embodiment, the injection needle 110 is a blunt end, non-sterile stainless steel, 12- or 14-gauge needle with an inert plastic or stainless-steel hub 116. The needle is preferably of a rigid non-flexible material, e.g., stainless steel or PVC. Said another way, the needle member 110 may not be capable of bending under bending forces of approximately 5 lbf. The needle member 110 has a blunt end at the terminal end of the needle member 110 to maintain an even distribution of the adhesive material and prevent puncturing of any flooring material. Said another way, the terminal end does not taper in diameter to form a point that most needle members are commonly formed in.

Figure 5:
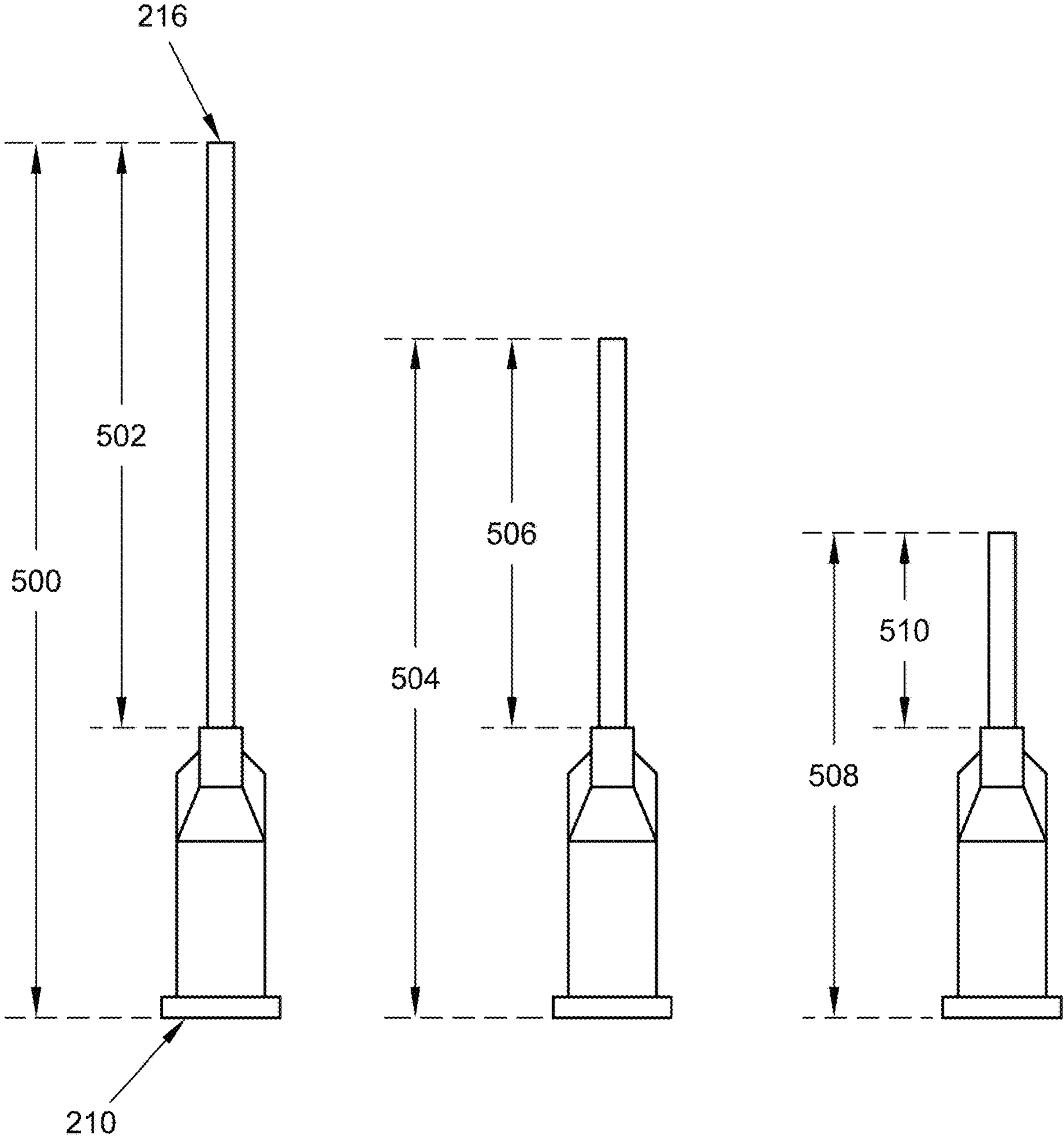
FIG. 5 is a front elevational view of several exemplary embodiments of an injection needle of the micro injection assembly, in accordance with the present invention.

Exemplary specifications of the injection needle 110 are an outer diameter of 0.083, inner diameter of 0.069, weight of 0.08 pounds, and length of 1.5 inches. FIG. 5 depicts several exemplary, yet preferred, lengths of the injection needle 110, i.e., lengths of the hub/needle 500, 504, 508 and needle 502, 506, 510 of approximately 2.2, 1.7, 1.2 in. and 1.5, 1.0, 0.5 in., respectively. As such, the length of the needle 110 relative to the outer diameter, exemplified below, provides an advantageous slender configuration of the needle 110 that effectuates repeated and durable use of the needle 110 for entering and removing the needle from an opening between two pieces of flooring material 300. In one embodiment, the slender configuration uniformly spans the entire length of the needle 110. Said another way, the assembly 100 may have an overall hub-needle length 500 separating the first end 210 of the hub 116 and the distal end 206 of the needle member 110 and a needle member length 502 separating the second end 214 of the hub 116 and the distal end 206 of the needle member 110, wherein the overall hub-needle length 500 may beneficially have a length variance ranging from 0.5-1.5 in. relative to the needle member length 502 to ensure needle member 110 integrity and effectiveness when utilized with the flooring material 300 and subfloor 302.

Additionally, the needle 110 may be beneficially formed in a linear configuration. The blunt end improves user safety, while the narrow diameter provides a precise and micro application of the liquid adhesive into tight or narrow spaces. The second end 108 is operably configured to receive injection needles 110 having any of the following dimensions:

| | Inner Diameter | | Outer Diameter | |
|---|---|---|---|---|
| Gauge | IN | MM | IN | MM |
| 14 | 0.069 | 1.77 | 0.083 | 2.11 |
| 15 | 0.059 | 1.51 | 0.072 | 1.83 |
| 16 | 0.053 | 1.35 | 0.065 | 1.65 |
| 18 | 0.038 | 0.99 | 0.049 | 1.27 |
| 19 | 0.033 | 0.79 | 0.043 | 1.06 |
| 20 | 0.025 | 0.64 | 0.036 | 0.91 |
| 21 | 0.022 | 0.56 | 0.033 | 0.82 |
| 22 | 0.020 | 0.46 | 0.028 | 0.72 |
| 23 | 0.016 | 0.41 | 0.025 | 0.64 |
| 25 | 0.012 | 0.30 | 0.020 | 0.51 |
| 26 | 0.011 | 0.26 | 0.019 | 0.46 |
| 27 | 0.009 | 0.22 | 0.016 | 0.41 |
| 30 | 0.006 | 0.15 | 0.012 | 0.31 |

In one embodiment, the first end 106 of the body 104 is operably configured for attachment to a cartridge 114 containing the liquid adhesive. Beneficially, the assembly 100 may be reused multiple times, even after the cartridge 114 containing the liquid adhesive is fully used and empty. The cartridge 114 is simply replaced with a new one and the first end 106 of the assembly 100 is attached to the new cartridge 114. For ease of use, the cartridge 114 containing the liquid adhesive may be received in a caulk gun which would provide for a faster and more efficient application of the liquid adhesive. The hub and needle member 110 may also be beneficially replaced depending on the application and/or wear of the needle member 110.

Said another way, the assembly 100 may include an adapter 102 with an adapter body 104 having a first end 106, a second end 108 opposing the first end 106 of the adapter body 104, a recessed internal wall surface 212 defining a threaded configuration operably configured to couple with a threaded tube 114, and that defines an internal channel 200 spanning from the first end 106 of the adapter body 104 to the second end 108 of the adapter body 104. The assembly 100 also includes a hub 116 selectively removably coupled to the adapter body 104, having a first end 210 disposed in a directly adjacent configuration with the second end 108 of the adapter body 104, having a second end 214 opposing the first end 210 of the hub 116, and having a rigid needle member 110 coupled thereto and recessed within the hub 116. The rigid needle member 110 can be seen projecting outwardly from the second end 214 of the hub 116 in a linear orientation, having a blunt distal end 206, and defining a needle channel 204 spanning from the blunt distal end 206 to the first end 210 of the hub 116, wherein the needle channel 206 is in fluid communication with the internal channel 200.

The present invention also discloses a micro injection method for the repair of floors where the flooring material 300 has become separated from the subfloor 302 and created a void between the flooring material 300 and the subfloor 302. The method comprises an initial Step of determining a separated area of the flooring material 300, i.e., a loose, hollow, or separated, broken flooring. The problem area(s) may be located using a tapping dowl and marked using chalk or tape. A next Step entails drilling a plurality of holes within the problem area(s). Any debris within the plurality of holes may be vacuumed out to beneficially facilitate a stronger or cleaner adhesive bond. The first end 106 of the adaptor 102 is then screwed onto the cartridge 114 containing the liquid adhesive. Next, the resealable cap 200 is unscrewed and removed from the adaptor body 104. The injection needle 110 is then screwed onto and attached to the adaptor 102. In accordance with a next Step, and using the caulk gun, the user slowly and gently injects the liquid adhesive from the cartridge 114 with the fully assembled adaptor 102 attached, into the plurality of holes drilled into the floor. Specifically, before the liquid adhesive is injected into the void, the cartridge 114 containing the liquid adhesive is placed in a caulk gun for greater ease of use and application of the liquid adhesive. A next Step entails stopping injection of the liquid adhesive followed by the Step of allowing the liquid adhesive to set. If needed, the resealable cap 200 is screwed onto and attached to the adaptor 102 to keep any remaining adhesive from drying out in the cartridge 114 for future use. Any excess adhesive is then wiped off the floor with a wet sponge and the area is allowed to dry for 24 hours. Any holes are then filled with grout or wood filler.

Said another way, the present invention may be described as a method of repairing loose flooring material 300 relative to a subfloor 302 and may first start at step 600 and proceed to step 602 of providing an adapter body 104, hub 116, needle member 110, and/or cap 400 with many of the above-referenced features. For example, the adapter body 104 may include a threaded configuration and an internal channel 200 therethrough, the hub 116 may include the rigid needle member 110 coupled thereto, of a slender configuration, defining the needle channel 206 therethrough, and having the distal end 206 defining an opening from which adhesive material is emitted. The invention also includes providing the cap 400 that may be selectively removably couplable to the adapter body 104.

Next, step 604 includes coupling the threaded configuration of the adapter body 104 to a threaded configuration of a tube 114 filled with an adhesive material 306. As part of this step 604 or after this step 604, the process may include coupling the hub 116 to the adapter body in a watertight configuration. Before step 604, the process may include opening the tube 114, particularly the mouth 112 of the tube 114, to provide the user access to the adhesive or other material within the tube 114. As mentioned previously, this may be done by drilling a hole in the mouth of the tube 114. When the hub 116 and needle member 110 are selectively attached to the adapter body 104, the needle member 110 is preferably configured in a linear orientation. Said another way, the needle member 110 is oriented and/or parallel to the orientation of the tube 114. When attached to the tube 114, the internal channel 200 and the needle channel 204 may also be overlapping with or concentrically displaced relative to the upper opening 202 defined by the mouth 112. In one embodiment, the process includes coupling the hub 116 to the adapter body 104 in directly adjacent configuration and, in some embodiments, coupling the hub 116 to the adapter body 104 by inserting the hub 116 within the recessed annular channel 216.

Figure 3:
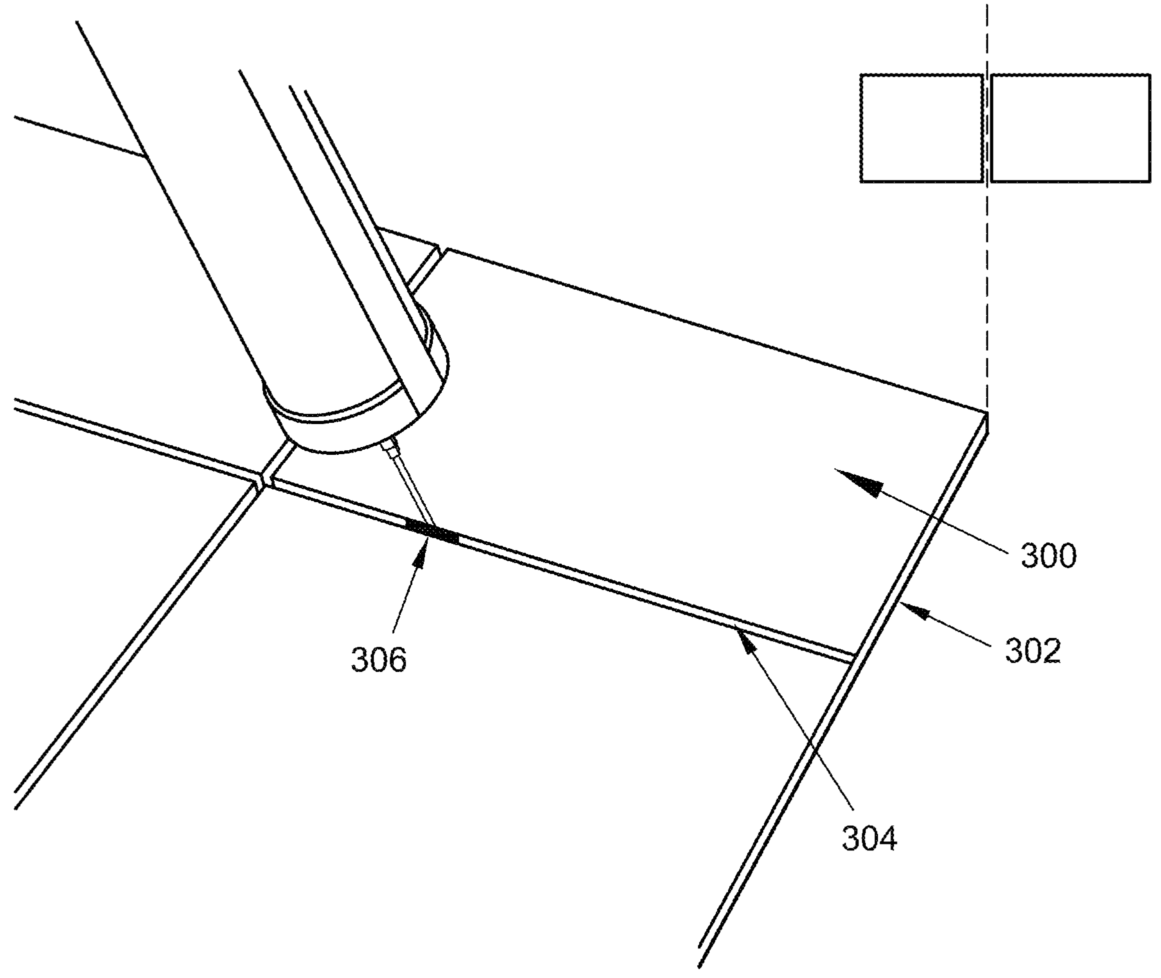
FIG. 3 is a front perspective view of the micro injection assembly according to FIG. 1 with a resealable cap thereon, in accordance with the present invention.
Figure 4:
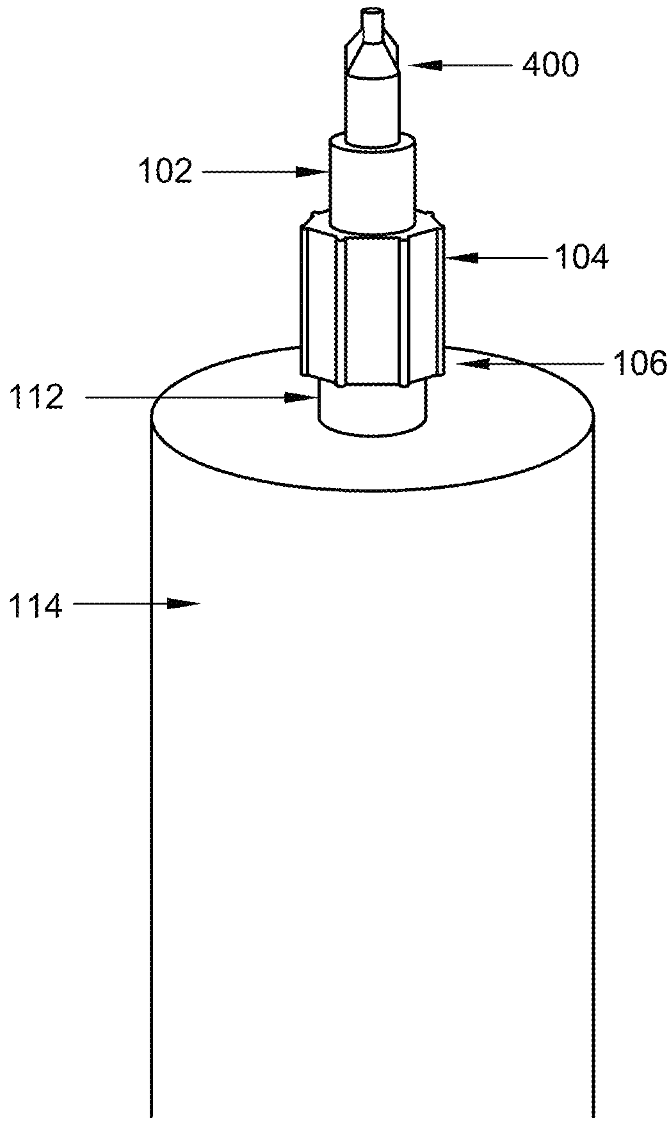
FIG. 4 is a top perspective view of a liquid adhesive being applied using the micro injection assembly and method, in accordance with the present invention.

Next, as best exemplified by FIG. 3, step 606 includes inserting the rigid needle member 110 into an opening 304 adjacent to or between two pieces of flooring material 300 loosely coupled to a subfloor. Said another way, the flooring material 300 may be at least partially separated from the subfloor 302 such that when the user modulates the tube 114 to emit adhesive out of the needle member 110 it causes the adhesive to flow where the flooring material 300 is separated and ultimately up through the opening where the needle member 110 is inserted or another opening between the flooring material 300. In one embodiment, the needle member 110 is inserted into the opening until reaching the subfloor 300 or other stopping point, whereby the rigidity, dimensions, and/or configuration of the needle member 110 prevents the needle member 110 from inadvertently breaking and prolongs the utilization thereof.

Next, the process includes the step 608 of modulating the tube 114 (e.g., by using a piston on a caulk gun) to transport the adhesive material from the tube 114 through the internal channel 200, through the needle channel 206, out through the opening of the distal end 206 of the rigid needle member 110, and between the flooring material 300 and subfloor 302. When the adhesive material cures, this beneficially reseals or attaches the flooring material 300 to the subfloor 302.

Next, the process may include proceeding to step 610 of uncoupling the hub 116 from the adapter body adapter body and coupling the cap 400 to the adapter body 104 in a watertight configuration when the user desires to reuse the tube 114. The cap 400 may couple and uncouple to the adapter body 104 using a tongue-and-groove configuration and in a hermetically sealed configuration (e.g., using a rubber seal). The process may terminate at step 612.

What is claimed is:

1. A micro injection system for repairing of floors, the system comprising:

an adapter body having a first end, a second end opposing the first end of the adapter body, a recessed internal wall surface defining a configuration operably configured to couple with a tube, and defining an internal channel spanning from the first end of the adapter body to the second end of the adapter body;

a hub having a first end disposed in a directly adjacent configuration with the second end of the adapter body, having a second end opposing the first end of the hub, and having a needle member projecting outwardly from the second end of the hub in a linear orientation, the needle member having a distal end, and defining a needle channel spanning from the distal end to the first end of the hub, wherein the needle channel is in fluid communication with the internal channel; and a cap selectively removably couplable to the adapter body in a watertight configuration with the cap disposable in an overlapping configuration with the second end of the adapter body;

wherein the needle member ranges in dimension from 12-30 gauge and is configured for insertion into a drilled access hole to deliver adhesive directly into a void between a loose flooring material and a subfloor while the flooring material remains in place.

2. The micro injection system according to claim 1, wherein the adapter body further comprising:

a lower section having the first end of the adapter body and the recessed internal wall surface; and an upper section adjacent to the lower section, having the second end of the adapter body, and tapered in diameter relative to a diameter of the lower section of the adapter body.

3. The micro injection system according to claim 2, wherein the upper section further comprising a spout surrounded by a recessed annular channel, the recessed annular channel with the hub disposed therein.

4. The micro injection system according to claim 2, wherein the lower section and the upper section are of a monolithic structure.

5. The micro injection system according to claim 1, wherein the cap is disposable in an overlapping configuration with the second end of the adapter body.

6. The micro injection system according to claim 1, wherein the needle member ranges in dimension from 20-30 gauge.

7. The micro injection system according to claim 1, wherein the adapter body further comprising a spout surrounded by a recessed annular channel, the recessed annular channel with the hub disposed therein.

8. The micro injection system according to claim 1, further comprising an overall hub-needle length separating the first end of the hub and the distal end of the needle member and a needle member length separating the second end of the hub and the distal end of the needle member, wherein the overall hub-needle length has a length variance ranging from 0.5-2.2 in. relative to the needle member length.

9. A method of repairing loose flooring comprising the steps of:

providing an adapter body defining an internal channel therethrough, a hub with a needle member, the needle member defining a needle channel therethrough, and having a distal end defining an opening;

coupling the adapter body to a tube filled with an adhesive material and having the hub in a watertight configuration with the adapter body;

inserting the needle member into an opening adjacent to a piece of flooring material loosely coupled to a subfloor, the opening ranging in dimension from 0.036-0.012 inches;

modulating the tube to transport the adhesive material from the tube through the internal channel, through the needle channel, out through the opening of the distal end of the needle member, and between the flooring material and subfloor; and coupling a cap to the adapter body in a watertight configuration.

10. The method according to claim 9, wherein coupling the cap to the adapter body is in a hermetically sealed configuration and disposable in an overlapping configuration with a second end of the adapter body that is adjacent to a first end of the hub.

11. The method according to claim 9, wherein the hub and the adapter body is in directly adjacent configuration.

12. The method according to claim 9, further comprising the steps of:

providing the adapter body with a spout surrounded by a recessed annular channel; and having the hub within the recessed annular channel.

13. The method according to claim 12, further comprising the step of threadedly coupling the hub to the adapter body.

14. The method according to claim 9, further comprising the step of providing the needle member projecting from the hub in a linear orientation and having a distal end.

15. The method according to claim 9, further comprising the steps of:

providing the adapter body with a lower section having a first end of the adapter body and a recessed internal wall surface and an upper section adjacent to the lower section, having a second end of the adapter body located thereon, and tapered in diameter relative to a diameter of the lower section of the adapter body; and coupling the recessed internal wall surface, with a threaded configuration thereon, to the adapter body to the tube.

16. The method according to claim 9, further comprising the step of providing the needle member that ranges in dimension from 20-30 gauge.

* * * * *